United States Patent [19]

Santo

[11] 4,334,331
[45] Jun. 15, 1982

[54] PERIMETER SUPPORT FOR A WATERBED MATTRESS

[76] Inventor: Philip J. Santo, 3750 Monroe Ave., Pittsford, N.Y. 14534

[21] Appl. No.: 136,822

[22] Filed: Apr. 3, 1980

[51] Int. Cl.³ .............................................. A47C 27/08
[52] U.S. Cl. ........................................ 5/452; 5/451; 5/455; 403/231; 403/382
[58] Field of Search .................. 5/451, 452, 449, 448, 5/455, 482, 485; 403/205, 403, 231, 382

[56] References Cited

U.S. PATENT DOCUMENTS

| | | | |
|---|---|---|---|
| 695,677 | 3/1902 | Faris | 403/231 |
| 3,490,797 | 1/1970 | Platte | 403/231 |
| 3,735,432 | 5/1973 | Kreten et al. | 5/451 |
| 3,899,797 | 8/1975 | Gunst | 5/458 |
| 3,989,397 | 11/1976 | Baker | 403/205 |
| 4,057,862 | 4/1977 | La Bianco | 5/451 |
| 4,145,781 | 3/1979 | Autrey et al. | 5/451 |
| 4,181,990 | 1/1980 | Santo | 5/455 |
| 4,193,151 | 3/1980 | Callbance | 5/452 |
| 4,197,602 | 4/1980 | Johenning | 5/411 |

Primary Examiner—Alexander Grosz
Attorney, Agent, or Firm—Lawrence P. Kessler

[57] ABSTRACT

A self-contained compressible chamber for supporting the perimeter of the fluid-filled, flexible bladder of a waterbed mattress which provides improved structural rigidity. The chamber includes a compressible medium and an elongate, substantially rigid member extending therethrough. Individual chambers are retained in supporting engagement with the perimeter of the bladder. The ends of the rigid members of the individual chambers are fastened to adjacent rigid members, whereby the perimeter of the bladder is substantially completely supported with an improved degree of structural rigidity while retaining mattress edge comfort.

12 Claims, 11 Drawing Figures

PERIMETER SUPPORT FOR A WATERBED MATTRESS

BACKGROUND OF INVENTION

This invention relates generally to waterbeds, and more particularly to apparatus for supporting the perimeter of a fluid-filled flexible bladder of a waterbed mattress.

Floatation sleep systems, commonly referred to as waterbeds, have become a popular alternative to conventional bedding. This is because waterbeds provide totally balanced body support which has been found to induce a superior state of relaxation. There are four common configurations for waterbeds in use today.

The first mattress configuration includes a free-standing, flexible bladder filled with liquid, such as water. Since the free-standing bladder is flexible in all directions, it must be of a bottom-to-top dimension (height) to prevent "bottoming out" when a body is supported thereon. Such dimension makes getting on and off the mattress awkward, and the flexible side walls make sitting on the edge difficult.

In the second mattress configuration, a frame is located about the lateral marginal edges of the flexible bladder. The frame supports the side walls of the bladder so as to maintain a desired height to prevent bottoming out. However, the side walls of the frame still make getting on and off the mattress, or sitting on the edge, uncomfortable. The third mattress configuration was devised to overcome this problem. In the third configuration, a compressible medium, such as foam, surrounds at least a portion of the lateral marginal edges of the flexible bladder to form the frame. (See for example, U.S. Pat. No. 3,840,921, issued Oct. 15, 1974, in the name of Labianco.) While this configuration solves the comfort problem associated with the edges of previous configurations, it adds considerably to the cost and complexity of assembly of the overall floatation system.

In order to keep down the cost and facilitate assembly yet provide edge comfort, a forth mattress configuration utilizes compressible air chambers in the lateral marginal edges of the flexible bladder. (See, for example, U.S. Pat. No. 4,079,473, issued Mar. 21, 1978, in the name of Phillips.) The air chambers provide edge comfort and maintain the mattress at a desired height, but are subject to deterioration of the seals between the air and liquid chambers and require replacement of the entire mattress when the air chambers are breached (by liquid or by external puncturing). Accordingly, in my U.S. Pat. No. 4,181,990, issued Jan. 8, 1980, I proposed a modification of this forth mattress configuration in which sleeves are attached to the lateral marginal edges of the flexible bladder. The sleeves slidably receive self-contained air (or foam) chambers to support the sides of the bladder and provide edge comfort. These self-contained chambers are not effected by the liquid in the bladder, and can be individually replaced if punctured so that the entire mattress need not be replaced. Another modification to the forth mattress configuration has been set forth in my copending U.S. patent application Ser. No. 121,281 filed Feb. 13, 1980, now abandoned. In this modification, a liner for containing any fluid escaping from the waterbed mattress removably receives the self-contained compressible chambers.

SUMMARY OF THE INVENTION

This invention is directed to a self-contained compressible chamber for supporting the perimeter of the fluid-filled, flexible bladder of a waterbed mattress which provides improved structural rigidity. The chamber includes a compressible medium and an elongate, substantially rigid member extending therethrough. Individual chambers are retained in supporting engagement with the perimeter of the bladder. The ends of the rigid members of the individual chambers are fastened to adjacent rigid members, whereby the perimeter of the bladder is substantially completely supported with an improved degree of structural rigidity while retaining mattress edge comfort.

The invention, and its objects and advantages, will become more apparent from the detailed description of the preferred embodiments presented below.

BRIEF DESCRIPTION OF THE DRAWINGS

In the detailed description of the preferred embodiments of the invention presented below, reference is made to the accompanying drawings, in which:

Referring now specifically to the drawings, FIGS. 1 and 2 show an arrangement 10 for a waterbed mattress having the perimeter support shown and described in my aforementioned U.S. Pat. No. 4,181,990, and utilizing the self-contained compressible chambers 12 for providing improved structural rigidity according to this invention. The arrangement 10 includes a bladder 14 of fluid-impervious flexible, dimensionally stable material, such as polyethelene or polypropelene for example. The bladder 14 forms a chamber 16 filled with a fluid (typically water) which exerts lateral forces F on the interior of the side walls 14a of the bladder perimeter. The self-contained compressible chambers 12 are slidably received within sleeves 18 attached to the bladder so as to be coextensive with the side walls 14a. The sleeves 18 are of a flexible, dimensionally stable material compatible to the bladder material so that attachment can be effected by heat sealing, for example. The sleeves retain the chambers 12 in engagement with the perimeter of the bladder so that the lateral forces F exerted by the fluid on the interior of the side walls 14a are counteracted by the chambers.

In FIG. 3, a waterbed mattress arrangement 10' is shown having the modified perimeter support shown and described in my copending U.S. patent application Ser. No. 121,281, now abandoned, and utilizing the chambers 12 for improved structural rigidity according to this invention. In the arrangement 10', a liner 30 of flexible, dimensionally stable material is coextensive with the bottom, side, and a portion of the top surfaces of the bladder 14. The liner material, which is polyethelene or polypropelene for example, traps any fluid escaping from the bladder. The sleeves 18, for retaining the self-contained compressible chambers 12 in supporting engagement with the bladder perimeter, are attached to the liner 30 so as to be coextensive with the side walls 30a. Of course, while mattress arrangements 10 and 10' are particularly shown and described, other arrangements are intended to be included within the scope of this invention, providing only that they include slidably received, self-contained compressible chambers for supporting the mattress perimeter.

Figure 1:
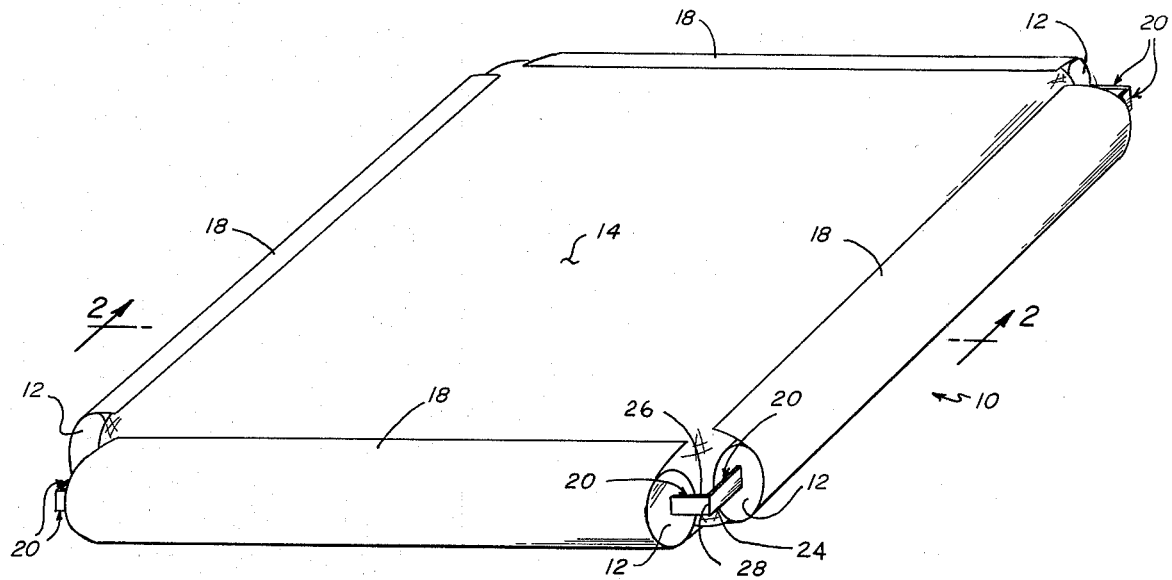
FIG. 1 is a top-front view, in perspective of a waterbed mattress having self-contained compressible chambers according to this invention retained for perimeter support.

In order to provide the improved structural rigidity according to this invention, each of the slidably received self-contained compressible chambers 12 used in the arrangement 10 or 10' have an elongated rigid member 20 extending through a generally cylindrical-shaped compressible medium 22. The rigid members 20 are elongated bars of metal or hard plastic. The ends 24, 26 of the rigid member 20 terminate beyond the respective ends of the compressible medium cylinder 22, and adjacent members 20 are positively interconnected as at 28. The interconnection of the members 20 forms a rigid frame which more adequately supports the perimeter of the mattress bladder 14. The improved support comes from the fact that deformation of any chamber 12 due to lateral forces F or forces induced by a person sitting on the edge of the mattress over the chamber is prevented. At the same time, the basic advantages of perimeter support described in my U.S. Pat. No. 4,181,990, including personal comfort upon sitting on the mattress edge, are still present.

Figure 4:
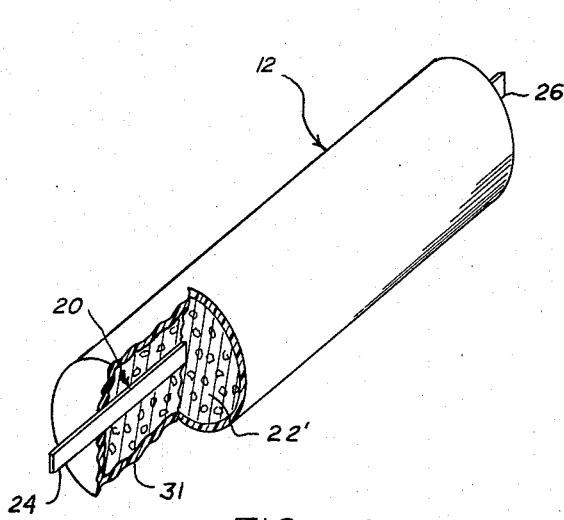
FIG. 4 is a top-front view, in perspective, of a self-contained compressible chamber according to this invention, with a portion broken away to facilitate viewing.
Figure 5:
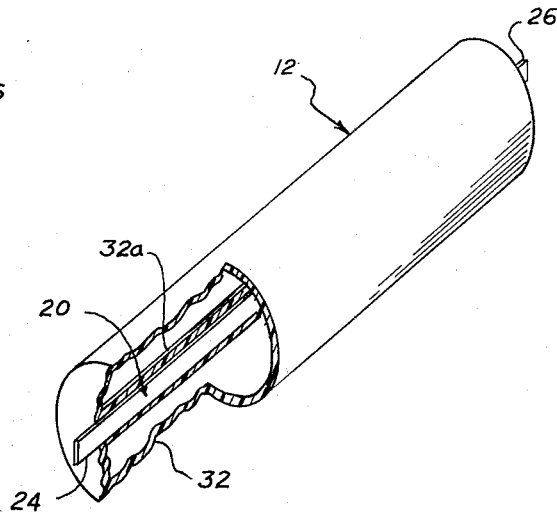
FIG. 5 is a top-front view, in perspective, of an alternate embodiment of a self-contained compressible chamber according to this invention, with a portion broken away to facilitate viewing.

Different embodiments of the self-contained compressible chamber 12 are shown in FIGS. 4 and 5 respectively. In the embodiment of FIG. 4, the chamber includes a compressible medium cylinder 22' of foam, such as styrofoam or urethane. The foam is surrounded by a protective liner 31, of polyethelene or polystyrene, for example. The rigid member 20 extends through the foam substantially coincident with the axis of the cylinder. On the other hand, the chamber of the embodiment of FIG. 5 includes a protective liner 32 which forms a complete housing for the compressible medium cylinder 22'. The liner 32 has an internal wall 32a forming a passage substantially coincident with the axis of chamber. The rigid member 20 extends through such passage. By utilizing the complete housing concept of the embodiment of FIG. 5, the compressible medium could be compressed air.

Figure 6:
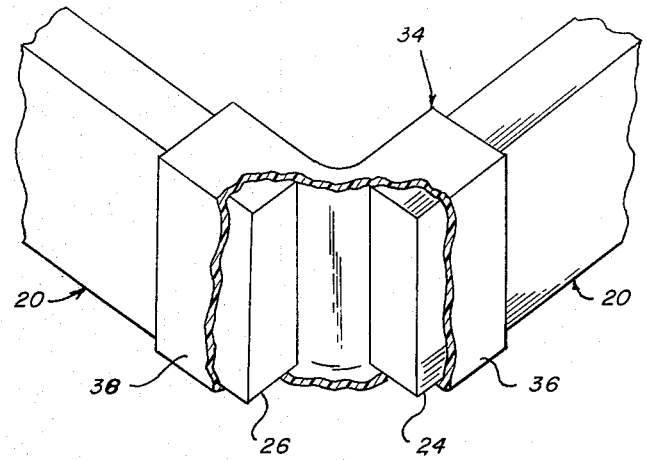
FIG. 6 is a top-front view, in perspective, of the interconnection between the rigid members of adjacent self-contained compressible chambers; with a portion broken away to facilitate viewing.

The positive interconnection of the ends 24, 26 of adjacent rigid members 22 may be accomplished by, for example, a connector mechanism 34 shown in FIG. 6, with a portion broken away to facilitate viewing. The connector mechanism 34 includes a housing having a first receptacle 36 and a second receptacle 38, joined at substantially a right angle. The housing is preferably formed of rigid plastic, but other suitable materials may be used. When chambers 12 are located in sleeves 18 against the perimeter of the waterbed mattress bladder 14, receptacle 36 slidably receives end 24 of the member 20, while receptacle 38 slidably receives end 26 of the adjacent member 20. The members 20 are thus retained in their relative positions against the bladder perimeter to provide the improved structural rigidity for the perimeter support.

Figure 2:
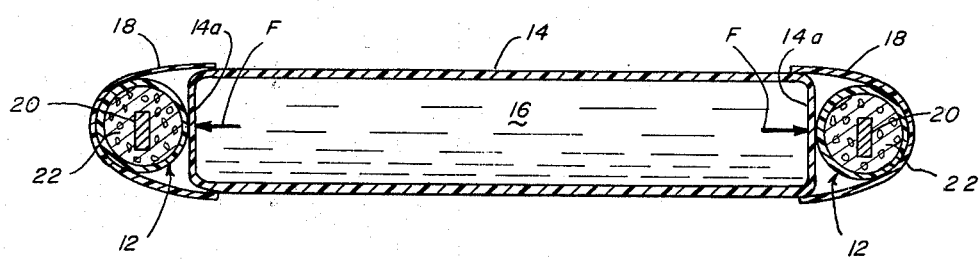
FIG. 2 is an end view of the waterbed mattress and retained compressible chambers in cross-section taken along lines 2—2 of FIG. 1.
Figure 3:
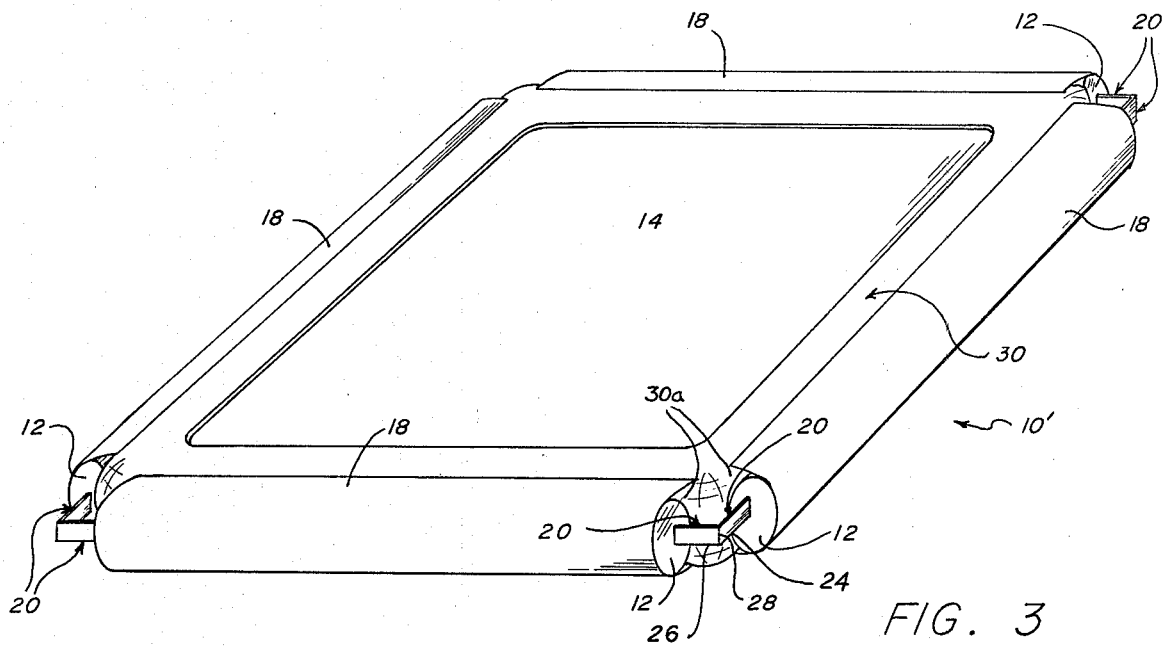
FIG. 3 is a top-front view, in perspective, of a waterbed mattress having a liner for retaining self-contained compressible chambers according to this invention for perimeter support.
Figure 7:
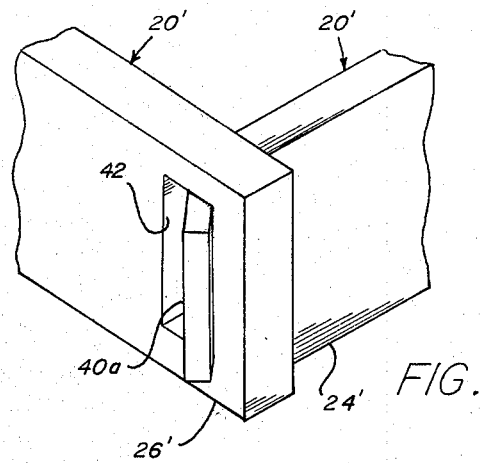
FIG. 7 is a top-front view, in perspective, of an alternate interconnection between modified rigid members.
Figure 8:
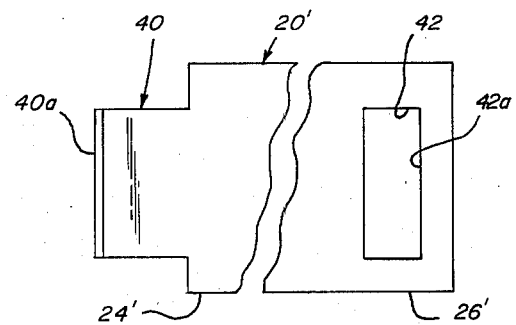
FIG. 8 is a side elevational view of a modified rigid member shown in FIG. 7.
Figure 9:
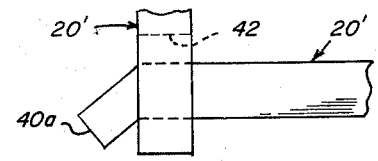
FIG. 9 is a top-plan view of the alternate interconnection shown in FIG. 7.

An alternative positive interconnection for adjacent rigid members is shown in FIGS. 7 through 9. In this alternative arrangement, each of the rigid members 20' has a tab 40 extending from the end 24' of the member. The tab 40 has a portion 40a bent slightly with respect to a vertical plane through the member 20'. The opposite end 26' of the member has an opening 42 of a dimension for receiving the bent tab 40. When the chambers 12 are located in sleeves 18, the tabs 40 are inserted in adjacent openings 42 (see FIG. 7 or 9) by compressing the chambers against the bladder 14 and sliding the tabs through respective adjacent openings. The location of the chambers 12 when they return to their normal perimeter supporting position (FIG. 1, 2 or 3), maintains the tabs 40 against walls 42a of respective openings 40. The bent portions 40a of respective tabs 40 in the openings thus prevents adjacent rigid members from moving relative to each other.

Figure 10:
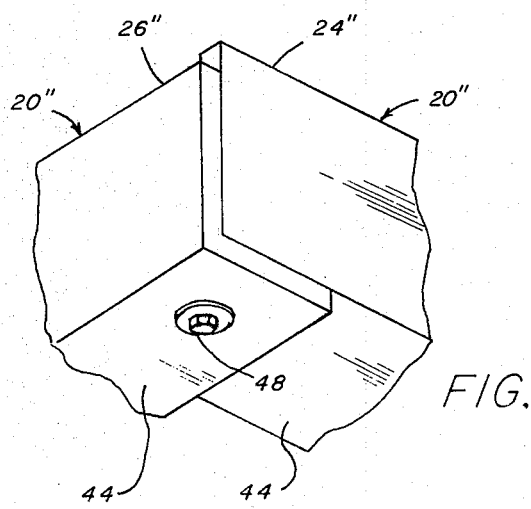
FIG. 10 is a bottom-front view, in perspective, of another alternate interconnection between different modified rigid members.
Figure 11:
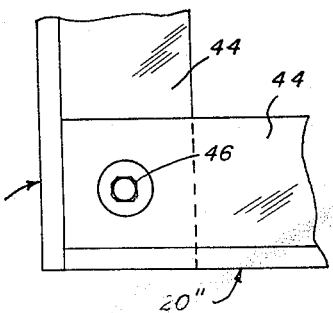
FIG. 11 is a top-plan view of the alternate interconnection shown in FIG. 10.

Another alternative positive interconnection of adjacent rigid members is shown in FIGS. 10 and 11. In this alternative arrangement, the rigid members 20" are angle irons with their horizontal leg 44 extending inwardly toward the bladder 14. The ends 24" and 26" of respective legs 44 have a bore (not shown). When the chambers 12 are located in sleeves 18, the bores in respective ends 24" and 26" of adjacent rigid members 20" are aligned, and threaded bolts 46 are respectively inserted therethrough. Nuts 48 are threaded on respective bolts 46 to maintain the adjacent rigid members 20" in their relative positions to provide the improved structural rigidity for the bladder perimeter support.

The invention has been described in detail with particular reference to preferred embodiments thereof, but it will be understood that variations and modifications can be effected within the spirit and scope of the invention.

I claim:

1. In a waterbed mattress having fluid-filled flexible bladder, means for supporting the perimeter of such bladder providing improved structural rigidity, said supporting means comprising:

at least two self-contained chambers, each such chamber including a compressible medium and an elongated rigid member substantially surrounded by said compressible medium and extending therethrough;

at least two flexible dimensionally stable sleeves attached to the flexible bladder to be coextensive with opposing perimeter portions of said bladder for releasably retaining said chambers respectively in contact with such perimeter of the bladder;

means for interconnecting said rigid members whereby the bladder is supported with an improved degree of structural rigidity by said chambers, the ends of said rigid members terminating beyond the respective ends of the chambers thereby facilitating the replacement of damaged chambers.

2. The invention of claim 1 wherein said compressible medium is foam.

3. The invention of claim 1 wherein said chambers include a substantially cylindrical housing filled with air, said housing having wall members of flexible, dimensionally stable material and defining a central passage for receiving said rigid member.

4. The invention of claim 1 wherein said interconnecting means includes a first receptacle adapted to receive an end of one rigid member, and a second receptacle, fixed to said first receptacle, adapted to receive an end of another rigid member, whereby said receptacles prevent relative movement between such rigid members.

5. The invention of claim 4 in which said waterbed mattress bladder has a substantially rectangular perimeter, and wherein there are four self-contained chambers and four sleeves attached to said sides of said bladder for retaining said chambers respectively in contact with the four sides of the bladder perimeter; and wherein said first and second receptacles are fixed to each other at substantially a right angle so as to respectively receive ends of adjacent rigid members.

6. The invention of claim 1 wherein said elongated rigid members define openings adjacent to respective ends of said members, and wherein said interconnecting means is a plurality of fasteners whereby when adjacent rigid members are located such that respective openings are aligned said fasteners are respectively inserted in the aligned openings to prevent relative movement of such adjacent members.

7. In a waterbed mattress having fluid-filed flexible bladder and liner surrounding at least the bottom and perimeter of said bladder for preventing the escape of fluid therefrom, means for supporting the perimeter of such bladder providing improved structural rigidity, said supporting means comprising:
at least two self-contained chambers, each such chamber including a compressible medium and an elongated rigid member substantially surrounded by said compressible medium and extending therethrough;
at least two flexible, dimensionally stable sleeves associated with said liner to be coextensive with opposing perimeter portions of the bladder for releasably retaining said chambers respectively in contact with such perimeter of the bladder;
means for interconnecting said rigid members whereby the bladder is supported with an improved degree of structural rigidity by said chambers, the ends of said rigid members terminating beyond the respective ends of the chambers thereby facilitating the replacement of damaged chambers.

8. The invention of claim 7 wherein said interconnecting means includes a first receptacle adapted to receive an end of one rigid member, and a second receptacle, fixed to said first receptacle, adapted to receive an end of another rigid member, whereby said receptacles prevent relative movement between such rigid members.

9. The invention of claim 8 in which said waterbed mattress bladder has a substantially rectangular perimeter, and wherein there are four self-contained chambers and four sleeves attached to said sides of said liner for retaining said chambers respectively in contact with the four sides of the bladder perimeter; and wherein said first and second receptacles are fixed to each other at substantially a right angle so as to respectively receive ends of adjacent rigid members.

10. The invention of claim 9 wherein said elongated rigid members define openings adjacent to respective ends of said members, and wherein said interconnecting means is a plurality of fasteners whereby when adjacent rigid members are located such that respective openings are aligned said fasteners are respectively inserted in the aligned openings to prevent relative movement of such adjacent members.

11. In a waterbed mattress having a fluid-filled flexible bladder, improved means for supporting the perimeter of such bladder comprising:
at least two self-contained chambers, each such chamber including a compressible medium, and an elongated rigid member substantially surrounded by said compressible medium and extending therethrough, said elongated rigid member having a tab extending from one end thereof, said tab having a portion bent at an angle to a vertical plane through such member, and the opposite end of said member defining an opening adapted to receive a similar tab; and
at least two flexible, dimensionally stable sleeves associated with the flexible bladder to be coextensive with opposing perimeter portions of the bladder for releasably retaining said chambers respectively in contact with such perimeter of the bladder, whereby when said chambers are retained by said sleeves respectively, said tabs are received in said openings of similar elongated rigid members so that the bladder is supported with an improved degree of structural rigidity by said chambers.

12. In a waterbed mattress having a fluid-filled flexible bladder and a liner surrounding at least the bottom and perimeter of said bladder for preventing escape of fluid therefrom, improved means for supporting the perimeter of such bladder comprising:
at least two self-contained chambers, each such chamber including a compressible medium and an elongated rigid member substantially surrounded by said compressible medium and extending therethrough, said elongated rigid member having a tab extending from one end thereof, said tab having a portion bent at an angle to a vertical plane through such member, and the opposite end of said member defining an opening adapted to receive a similar tab; and
at least two flexible, dimensionally stable sleeves associated with said liner to be coextensive with opposing perimeter portions of the contained bladder for releasable retaining said chambers in juxtaposition with such perimeter of the bladder, whereby when said chambers are retained by said sleeves respectively, said tabs are received in said openings of similar elongated rigid members so that the bladder is supported with an improved degree of structural rigidity by said chambers.

* * * * *